(No Model.)

J. B. CHRISTOPHER.
JOURNAL BEARING.

No. 579,041.  Patented Mar. 16, 1897.

Witnesses
John Everitt
F. B. Keefer

Inventor:
James B. Christopher.
By James L. Norris
Atty

UNITED STATES PATENT OFFICE.

JAMES B. CHRISTOPHER, OF MAHANOY CITY, PENNSYLVANIA.

JOURNAL-BEARING.

SPECIFICATION forming part of Letters Patent No. 579,041, dated March 16, 1897.

Application filed December 23, 1896. Serial No. 616,733. (No model.)

*To all whom it may concern:*

Be it known that I, JAMES B. CHRISTOPHER, a citizen of the United States, residing at Mahanoy City, in the county of Schuylkill and State of Pennsylvania, have invented new and useful Improvements in Journal-Bearings, of which the following is a specification.

This invention relates to journal-bearings, and has for its object to provide an improved roller-bearing more especially designed for railway-car axles, wherein the antifriction-rollers are maintained out of contact with each other at fixed and uniform distances apart and end thrust of the rollers prevented.

To these ends my invention consists in the features and in the construction, arrangement, or combination of parts hereinafter described, and definitely set forth in the claims following the description, reference being had to the accompanying drawings, forming a part of this specification, wherein—

Figure 1:
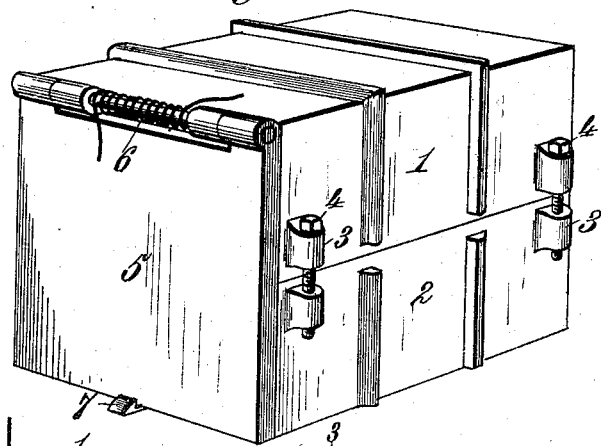
Figure 2:
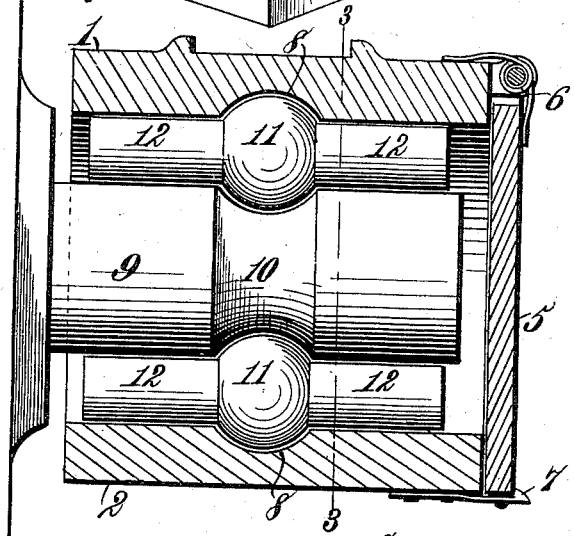
Figure 3:
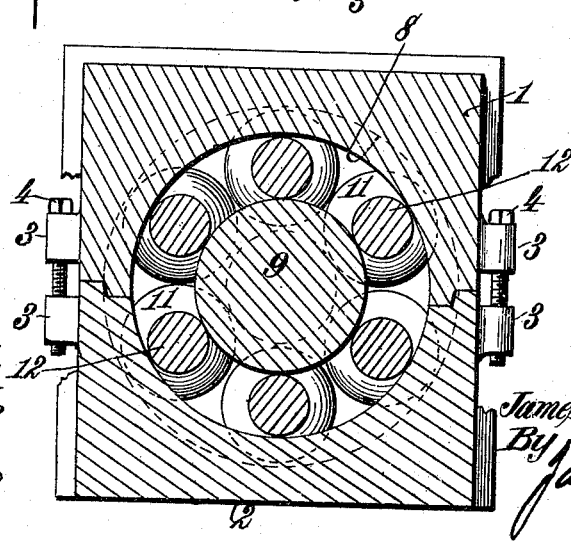

Figure 1 is a perspective view of a car-axle box embodying my invention. Fig. 2 is a longitudinal central section of the same, and Fig. 3 is a transverse section on the line 3 3 of Fig. 2.

Referring to the drawings, the numerals 1 and 2 respectively indicate the corresponding halves of a car-axle box provided at the ends with perforated lugs 3, through which are passed the bolts 4, which secure the two halves of the box together. The box at its outer end is closed by a hinged lid 5, normally held closed by a spring 6, and fastened in its closed position by a catch 7, attached to the lower half 2 of the box. The interior of the box is in the form of a cylindrical chamber, in which are disposed the axle and rollers, and midway between its ends is provided with an annular groove 8, curved in cross-section on the arc of a circle, as shown. The axle 9 is provided with a corresponding groove 10, which, when the parts are in position, lies opposite the groove 8. Disposed in the grooves 8 and 10 are a plurality of balls 11, each of which is provided with axial cylindrical extensions 12, forming rollers. The rollers 12 project centrally from the balls 11 in opposite directions and have a rolling bearing on the axle and the interior of the axle-box. The grooves 8 and 10 are formed on the arc of a circle slightly greater than the diameter of the balls 11, whereby the balls are not in contact with either the axle or the journal-box, but each ball is in contact with the adjacent balls on each side, whereby the rollers 12 are maintained out of contact with each other and at uniform distances apart. The rollers are thus free to roll around between the axle and box without having any grinding or rubbing action one upon the other, whereby the friction is reduced to a minimum.

It will be noted that the rollers do not extend entirely to the ends of the box and are prevented from coming in contact with either end thereof by the balls 11, which, being seated in the grooves 8 and 10, resist any endwise movement of the rollers and receive any end thrust that may be imparted to the latter, and as the weight supported by the axle is sustained entirely by the rollers and as the balls and grooves present no sharp or abrupt edges or angles such end thrust will cause but very little friction.

The entire device is extremely simple, strong, and durable, and requires no lubricant, and can be very quickly assembled and taken apart.

I have shown and described my invention as applied to a railway-car-axle bearing, but it will be evident that it can be advantageously applied to journals of every description.

Having described my invention, what I claim is—

1. In a journal-bearing, the combination with a journal-box having an annular groove formed on its interior, of a journal arranged in the box and having a circumferential groove midway between its ends, and a plurality of balls disposed in said grooves in contact with each other but normally out of contact with the journal and journal-box and provided with oppositely-projecting rollers disposed between the journal and the box and unconnected one with the other, substantially as described.

2. In a journal-bearing, the combination with a journal-box having an arc-shaped annular groove formed on its interior, of a journal arranged in the box and having a circumferential arc-shaped groove midway between its ends, said grooves being formed on arcs of the same circle, and a plurality of balls arranged in contact with one another in said grooves and provided with oppositely-projecting rollers disposed between the journal and journal-box and in contact therewith, the said balls being true spheres of a less diameter than the diameter of the circle on which the said arc-shaped grooves are formed, whereby the balls are normally out of contact with both the journal and journal-box, substantially as described.

In testimony whereof I have hereunto set my hand in presence of two subscribing witnesses.

JAMES B. CHRISTOPHER.

Witnesses:
WM. E. JONES,
G. WAYNE STITZER.